United States Patent
Arndt et al.

(10) Patent No.: US 7,908,457 B2
(45) Date of Patent: Mar. 15, 2011

(54) RETAINING AN ASSOCIATION BETWEEN A VIRTUAL ADDRESS BASED BUFFER AND A USER SPACE APPLICATION THAT OWNS THE BUFFER

(75) Inventors: Richard L. Arndt, Austin, TX (US);
Aaron C. Brown, Austin, TX (US);
Bradly G. Frey, Austin, TX (US);
Gregory F. Pfister, Austin, TX (US);
Renato J. Recio, Austin, TX (US);
Steven M. Thurber, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 364 days.

(21) Appl. No.: 12/114,945

(22) Filed: May 5, 2008

(65) Prior Publication Data

US 2009/0276605 A1    Nov. 5, 2009

(51) Int. Cl.
*G06F 12/00* (2006.01)
*G06F 9/26* (2006.01)
*G06F 9/34* (2006.01)
*G06F 12/08* (2006.01)

(52) U.S. Cl. .......................................... 711/209; 711/3

(58) Field of Classification Search ....... 710/3; 711/209
See application file for complete search history.

(56) References Cited

U.S. PATENT DOCUMENTS

| | | | | |
|---|---|---|---|---|
| 4,277,826 A | * | 7/1981 | Collins et al. ................. | 711/206 |
| 4,777,595 A | * | 10/1988 | Strecker et al. ............... | 709/236 |
| 5,815,678 A | * | 9/1998 | Hoffman et al. .............. | 710/305 |
| 6,308,247 B1 | * | 10/2001 | Ackerman et al. ............ | 711/206 |
| 6,725,284 B2 | * | 4/2004 | Arndt ................................ | 710/5 |
| 2005/0256976 A1 | * | 11/2005 | Susairaj et al. .................. | 710/3 |

OTHER PUBLICATIONS

COS 318: Operating Systems Virtual Memory Design Issues http://www.cs.princeton.edu/courses/archive/fall08/cos318/lectures/Lec15-VM-Design.pdf.*
Virtual Memory Primitives for User Programs by Andrew W Appel and Kai Li.*
Linux Device Drivers, 2nd Edition by Alesandro Rubini and Jonathan Corbel.*
U.S. Appl. No. 12/114,954, filed May 5, 2008, Arndt et al.
USPTO U.S. Appl. No. 12/114,954, Image File Wrapper printed from PAIR Oct. 18, 2010, 1 page.

(Continued)

*Primary Examiner* — Henry W Tsai
*Assistant Examiner* — Eric T Oberly
(74) *Attorney, Agent, or Firm* — Francis Lammes; Stephon J. Walder, Jr.; Matthew B. Tatpia (57) ABSTRACT

Registering memory space for an application is performed. One or more open calls are received from an application to access one or more input/output (I/O) devices. Responsive to receiving the one or more open calls, one or more I/O map and pin calls are sent in order to register memory space for the one or more I/O devices within at least one storage area that will be accessed by the application. A verification is made as to whether the memory space to be registered is associated with the application. Responsive to the memory space being associated with the application, at least one virtual I/O bus address is received for each registered memory space of the one or more I/O devices. At least one I/O command is executed using the at least one virtual I/O bus address without intervention by an operating system or operating system image.

11 Claims, 6 Drawing Sheets

OTHER PUBLICATIONS

"COS 318: Operating Systems, Virtual Memory Design Issues", http://www.cs.princeton.edu/courses/archive/fall08/cos318/lectures/Lec15-VM-Design.pdf, 2008, 21 pages.

Appel, Andrew W. et al., "Virtual Memory Primitives for User Programs", http://portal.acm.org/citation.cfm?id=106972.106984 (1 of 10), May 18, 2010, 13 pages.

* cited by examiner

RETAINING AN ASSOCIATION BETWEEN A VIRTUAL ADDRESS BASED BUFFER AND A USER SPACE APPLICATION THAT OWNS THE BUFFER

BACKGROUND OF THE INVENTION

1. Field of the Invention

The present application relates generally to an improved data processing system and method. More specifically, the present application is directed to a virtual address based buffer to retain an association to a user space application that owns the buffer.

2. Background of the Invention

In the field of microprocessor based data processing systems, the use of industry standard I/O busses to improve the performance and expand the capabilities of the data processing systems is well known. Standardized I/O busses provide a mechanism for connecting a wide variety of peripheral devices to the host bus of a data processing system. Peripheral devices may include, for example, high speed network adapters, hard-disk controllers, graphics adapters, audio adapters, and a variety of other devices. Among the most prevalent of the industry standard I/O busses is the Peripheral Component Interface (PCI) bus. The PCI bus has evolved over the years from revision 2.0 introduced in 1992 operating at a bus frequency of 33 MHz, to revision 2.1 introduced in 1995 with a maximum bus frequency of 66 MHz, to revision 2.2 introduced in 1998 and incorporating features such as message interrupts. Under PCI Spec 2.2, PCI bridges support two types of transactions: posted transactions (including memory write cycles), which complete on the initiating bus before they complete on the target bus, and delayed transactions (including memory read requests and I/O and configuration read/write requests), which complete on the target bus before they complete on the initiating bus. A PCI device that initiates a delayed transaction must relinquish control of the local PCI bus and wait for the target device to return the requested data (in the case of a delayed read request) or a completion message (in the case of a delayed write request). Once the requested information has arrived, the requesting device must wait until it again receives control of the PCI bus in the normal course of operations before it can retrieve the information from the PCI bridge.

More recently, the PCI-X Addendum to Local Bus Specification Rev. 2.2 has been proposed as a means for further improving the performance of PCI busses. The PCI-X Addendum incorporates registered transactions that improve performance by permitting a PCI-X compatible bridge or I/O adapter to make decisions on every other clock cycle. In addition, PCI-X incorporates protocol enhancements such as the attribute phase and split transactions that allow more efficient use of the bus. PCI-X is fully backward compatible with conventional PCI systems such that conventional PCI adapters will work in PCI-X capable systems and PCI-X adapters will work in PCI systems. If a conventional PCI device is located on a PCI-X bus, however, all adapters on the bus must operate in conventional PCI mode regardless of whether they are PCI-X capable.

In known systems there are two types of PCI I/O adapters that connect to a PCI bus, I/O adapters that have memory registration capabilities, such as IB Host Channel Adapters (HCAs) or Internet Warp (iWARP) Remote Direct Memory Access (RDMA) enabled NICs, and I/O adapters that do not have memory registration capabilities, such as NICs, Small Computer System Interface (SCSI), and FC adapters. To provide memory on I/O adapters that do not have memory registration capabilities, host address translation and protection tables are used, such as a translation control entry (TCE) table or an input/output memory management unit (IOMMU), which is a memory management unit (MMU) that connects a DMA-capable I/O bus to the main memory.

For I/O adapters that do not contain a memory registration table, known mechanisms fail to retain an association of user space addresses to a specific application. That is, known systems fail to allow a virtual address based buffer to be registered on a peripheral component interconnect (PCI) host bridge and the registration to retain association with the user space application that owns the virtual address based buffer.

BRIEF SUMMARY OF THE INVENTION

In one illustrative embodiment, a method, in a data processing system, is provided for registering memory space for an application. The illustrative embodiments receive one or more open calls from an application to access one or more input/output (I/O) devices. Responsive to receiving the one or more open calls, the illustrative embodiments send one or more I/O map and pin calls in order to register memory space for the one or more I/O devices within at least one storage area that will be accessed by the application. The illustrative embodiments verify that the memory space to be registered is associated with the application. Responsive to the memory space being associated with the application, the illustrative embodiments receiving at least one virtual I/O bus address for each registered memory space of the one or more I/O devices. The illustrative embodiments execute at least one I/O command using the at least one virtual I/O bus address without intervention by an operating system or operating system image.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art, in view of the following detailed description of the exemplary embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE INVENTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
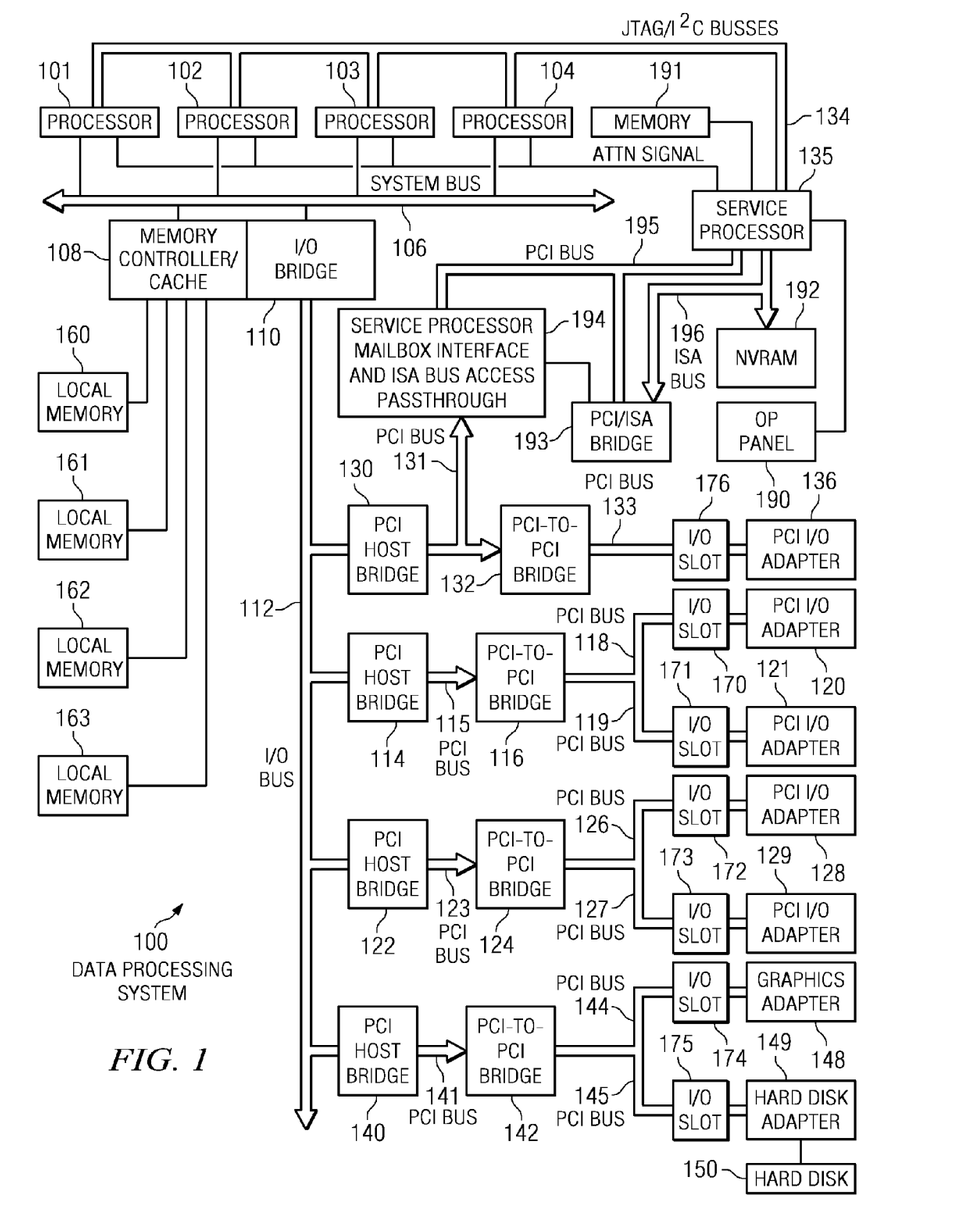
FIG. 1 depicts an exemplary block diagram of a data processing system in which the illustrative embodiments may be implemented.
Figure 2:
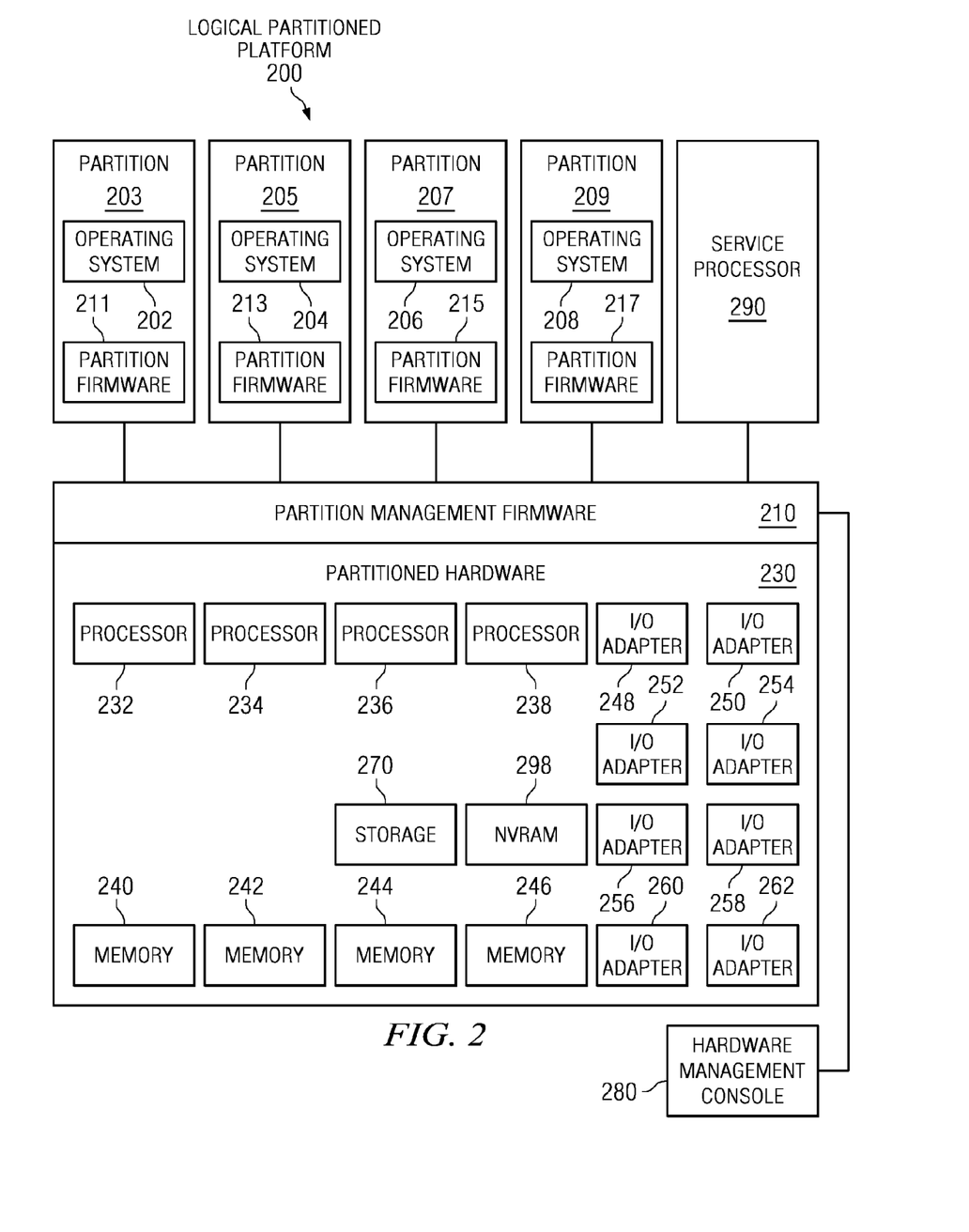
FIG. 2 depicts a block diagram of an exemplary logically partitioned platform in which the illustrative embodiments may be implemented.

The illustrative embodiments provide mechanisms for a virtual address based buffer to retain an association to a user space application that owns the buffer. These mechanisms ensure that multiple applications registering memory to the same I/O adapter do not share the same physical address, thereby causing that address space to be corrupted. As such, the mechanisms of the illustrative embodiments are especially well suited for implementation within a distributed data processing environment and within, or in association with, data processing devices, such as servers, client devices, and the like that are characterized by a high rate of relatively short I/O operations. In order to provide a context for the description of the mechanisms of the illustrative embodiments, FIGS. 1-2 are provided hereafter as examples of a distributed data processing system, or environment, and a data processing device, in which, or with which, the mechanisms of the illustrative embodiments may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts an exemplary block diagram of a data processing system in which the illustrative embodiments may be implemented. Data processing system 100 may be a symmetric multiprocessor (SMP) system, or a heterogeneous multiprocessor system, including a plurality of processors 101, 102, 103, and 104 connected to system bus 106. For example, data processing system 100 may be an IBM eServer, a product of International Business Machines Corporation of Armonk, N.Y., implemented as a server within a network. Moreover, data processing system 100 may be a Cell Broadband Engine (CBE) data processing system, another product of International Business Machines Corporation. Alternatively, a single processor system may be employed.

Also connected to system bus 106 is memory controller/cache 108, which provides an interface to a plurality of local memories 160-163. Input/Output (I/O) bus bridge 110 is connected to system bus 106 and provides an interface to I/O bus 112. Memory controller/cache 108 and I/O bus bridge 110 may be integrated as depicted.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120-121, 128-129, and 136, graphics adapter 148, and hard disk adapter 149, or individual functions of any of the above adapters, may be assigned to different logical partitions (LPARs). In this case, graphics adapter 148 provides a connection for a display device (not shown), while hard disk adapter 149 provides a connection to control hard disk 150.

Thus, for example, assume data processing system 100 is divided into three logical partitions, P1, P2, and P3. Each of PCI I/O adapters 120-121, 128-129, 136, graphics adapter 148, hard disk adapter 149, or individual functions of any of the above adapters, each of host processors 101-104, and memory from local memories 160-163 are assigned to the three partitions.

In these examples, local memories 160-163 may take the form of dual in-line memory modules (DIMMs). The DIMMs are not normally assigned on a per DIMM basis to the partitions but rather, a partition will be assigned a portion of the overall memory seen by the platform. For example, processor 101, some portion of memory from local memories 160-163, and I/O adapters 120, 128, and 129 may be assigned to logical partition P1; processors 102-103, some portion of memory from local memories 160-163, and PCI I/O adapters 121 and 136 may be assigned to partition P2; and processor 104, some portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. For example, one instance of the Advanced Interactive Executive (AIX®) operating system may be executing within partition P1, a second instance (image) of the AIX® operating system may be executing within partition P2, and a Linux® or OS/400 operating system may be operating within logical partition P3.

Peripheral component interconnect (PCI) host bridge 114, connected to I/O bus 112, provides an interface to PCI local bus 115. A number of PCI input/output adapters 120-121 may be connected to PCI bus 115 through PCI-to-PCI bridge 116, the PCI bus 118, the PCI bus 119, the I/O slot 170, and the I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations will support between four and eight I/O adapters (i.e. expansion slots for add-in connectors). Each PCI I/O adapter 120-121 provides an interface between data processing system 100 and input/output devices.

An additional PCI host bridge 122, connected to I/O bus 112, provides an interface for an additional PCI bus 123. PCI bus 123 is connected to a plurality of PCI I/O adapters 128-129. PCI I/O adapters 128-129 may be connected to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128 and 129. In this manner, data processing system 100 allows connections to multiple network computers.

A memory mapped graphics adapter 148 inserted into I/O slot 174 may be connected to I/O bus 112 through PCI bus 144, PCI-to-PCI bridge 142, PCI bus 141, and PCI host bridge 140. Hard disk adapter 149 may be placed into I/O slot 175, which is connected to PCI bus 145. In turn, this bus is connected to PCI-to-PCI bridge 142, which is connected to PCI host bridge 140 by PCI bus 141.

PCI host bridge 130 provides an interface for PCI bus 131 to connect to I/O bus 112. PCI I/O adapter 136 is connected to I/O slot 176, which is connected to PCI-to-PCI bridge 132 by PCI bus 133. PCI-to-PCI bridge 132 is connected to PCI bus 131. This PCI bus 131 also connects PCI host bridge 130 to service processor mailbox interface and ISA bus access passthrough logic 194. Service processor mailbox interface and ISA bus access passthrough logic 194 forwards PCI accesses destined to PCI/ISA bridge 193. Non-volatile RAM (NVRAM) storage 192 is connected to ISA bus 196.

Service processor 135 is coupled to service processor mailbox interface and ISA bus access passthrough logic 194 through its local PCI bus 195. Service processor 135 is also connected to processors 101-104 via a plurality of JTAG/I²C busses 134. JTAG/I²C busses 134 are a combination of JTAG/ scan busses (see IEEE 1149.1) and Phillips I²C busses. However, alternatively, JTAG/I²C busses 134 may be replaced by only Phillips I²C busses or only JTAG/scan busses. All SP-ATTN signals of host processors 101, 102, 103, and 104 are connected together to an interrupt input signal of the service processor 135. Service processor 135 has its own local memory 191 and has access to hardware OP-panel 190.

When data processing system 100 is initially powered up, service processor 135 uses JTAG/I²C busses 134 to interrogate the system (host) processors 101-104, memory controller/cache 108, and I/O bridge 110. At completion of this step, service processor 135 has an inventory and topology understanding of the data processing system 100. Service processor 135 also executes Built-In-Self-Tests (BISTs), Basic Assurance Tests (BATs), and memory tests on all elements found by interrogating host processors 101-104, memory controller/cache 108, and I/O bridge 110. Any error information for failures detected during the BISTS, BATs, and memory tests are gathered and reported by the service processor 135.

If a valid configuration of system resources is still possible after taking out the elements found to be faulty during the BISTs, BATs, and memory tests, then data processing system 100 is allowed to proceed to load executable code into the local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101-104, local memories 160-163, the I/O bridge 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for de-configuration during the current running session and future Initial Program Loads (IPLs).

Data processing system 100 may be implemented using various commercially available computer systems. For example, data processing system 100 may be implemented using IBM eServer™ iSeries® Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the illustrative embodiments set forth hereafter but is only meant to provide one example of a data processing system in which the exemplary aspects of the illustrative embodiments may be implemented.

With reference now to FIG. 2, a block diagram of an exemplary logically partitioned platform is depicted in which the illustrative embodiments may be implemented. The hardware in the logically partitioned platform 200 may be implemented, for example, using the hardware of the data processing system 100 in FIG. 1.

Logically partitioned platform 200 includes partitioned hardware 230, operating systems 202, 204, 206, 208, and partition management firmware 210. Operating systems 202, 204, 206, and 208 may be multiple copies of a single operating system or multiple heterogeneous operating systems simultaneously run on logically partitioned platform 200. These operating systems may be implemented, for example, using OS/400, which is designed to interface with a virtualization mechanism, such as partition management firmware 210, e.g., a hypervisor. OS/400 is used only as an example in these illustrative embodiments. Of course, other types of operating systems, such as AIX® and Linux®, may be used depending on the particular implementation. Operating systems 202, 204, 206, and 208 are located in logical partitions 203, 205, 207, and 209, respectively.

Hypervisor software is an example of software that may be used to implement platform (in this example, partition management firmware 210) and is available from International Business Machines Corporation. Firmware is "software" stored in a memory chip that holds its content without electrical power, such as, for example, a read-only memory (ROM), a programmable ROM (PROM), an erasable programmable ROM (EPROM), and an electrically erasable programmable ROM (EEPROM).

Logical partitions 203, 205, 207, and 209 also include partition firmware 211, 213, 215, and 217. Partition firmware 211, 213, 215, and 217 may be implemented using IPL or initial boot strap code, IEEE-1275 Standard Open Firmware, and runtime abstraction software (RTAS), which is available from International Business Machines Corporation.

When logical partitions 203, 205, 207, and 209 are instantiated, a copy of the boot strap code is loaded into logical partitions 203, 205, 207, and 209 by partition management firmware 210. Thereafter, control is transferred to the boot strap code with the boot strap code then loading the open firmware and RTAS. The processors associated or assigned to logical partitions 203, 205, 207, and 209 are then dispatched to the logical partition's memory to execute the logical partition firmware.

Partitioned hardware 230 includes a plurality of processors 232-238, a plurality of system memory units 240-246, a plurality of input/output (I/O) adapters 248-262, and storage unit 270. Each of processors 232-238, memory units 240-246, NVRAM storage 298, and I/O adapters 248-262 may be assigned to one of multiple logical partitions 203, 205, 207, and 209 within logically partitioned platform 200, each of which corresponds to one of operating systems 202, 204, 206, and 208.

Partition management firmware 210 performs a number of functions and services for logical partitions 203, 205, 207, and 209 to create and enforce the partitioning of logical partitioned platform 200. Partition management firmware 210 is a firmware implemented virtual machine identical to the underlying hardware. Thus, Partition management firmware 210 allows the simultaneous execution of independent OS images 202, 204, 206, and 208 by virtualizing all the hardware resources of the logical partitioned platform 200.

Service processor 290 may be used to provide various services, such as processing of platform errors in logical partitions 203, 205, 207, and 209. Service processor 290 may also act as a service agent to report errors back to a vendor, such as International Business Machines Corporation. Operations of the different logical partitions may be controlled through hardware management console 280. Hardware management console 280 is a separate data processing system from which a system administrator may perform various functions including reallocation of resources to different logical partitions.

For I/O adapters that do not contain a memory registration table, the illustrative embodiments provide mechanisms that retain the association of user space addresses to a specific application. The mechanism allows a virtual address based buffer to be registered on a peripheral component interconnect (PCI) host bridge and the registration to retain an association with the user space application that owns the virtual address based buffer. This mechanism ensures that multiple applications registering memory to the same I/O adapter do not share the same physical address, thereby causing that address space to be corrupted.

Figure 3:
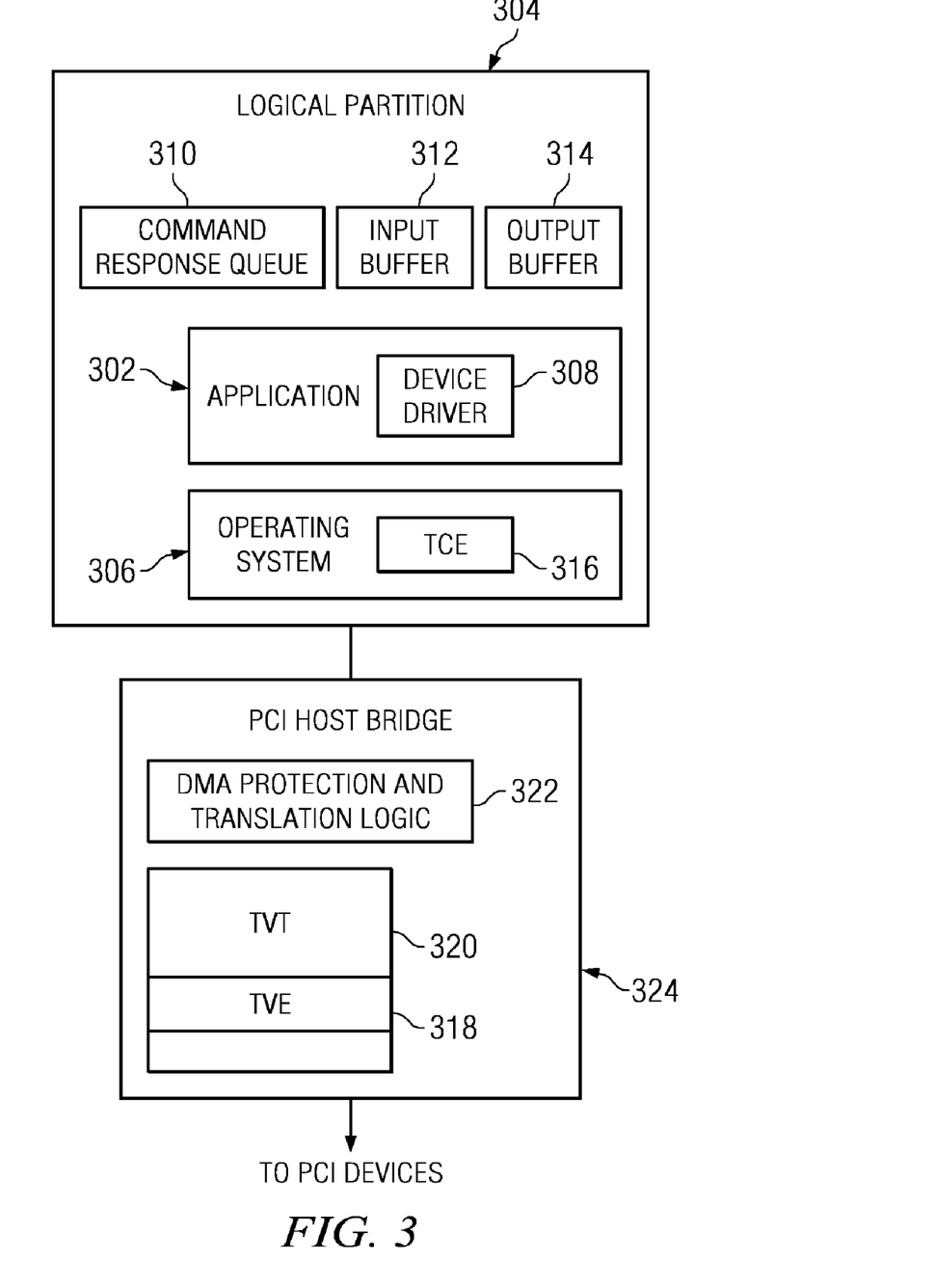
FIG. 3 depicts a block diagram of a system that maps a virtual address to PCI bus addresses in accordance with an illustrative embodiment.

FIG. 3 depicts an exemplary block diagram of a system that registers a virtual address based buffer on a peripheral component interconnect (PCI) host bridge and retains the registration as an association with the user space application that created the virtual address based buffer. Application 302 may be an application that is executed by operating system 306 in logical partition 304, such as logical partitions 203, 205, 207, and 209 of FIG. 2. When application 302 is initialized by operating system 306, application 302 sends one or more open calls to device driver 308 in order to access one or more I/O devices connected to PCI I/O adapters, such as PCI I/O adapters 120, 121, 128, 129, and 136 of FIG. 1. Responsive to the open call, device driver 308 sends one or more I/O map and pin calls to operating system 306 to register the memory space allocated to the command response queue 310, input buffer 312, and output buffer 314 for the I/O devices that will be accessed by application 302. As the memory spaces are registered for command response queue 310, input buffer 312, and output buffer 314, operating system 306 returns the virtual I/O bus addresses to be used by the associated I/O devices to device driver 308. The virtual I/O bus address may indicate the beginning virtual address of the registered memory space for command response queue 310, input buffer 312, and output buffer 314. Operating system 306 records the beginning virtual address to be used by the associated I/O device in each of command response queue 310, input buffer 312, and output buffer 314.

In order to register the command response queue 310, input buffer 312, and output buffer 314, application 302 provides: a starting virtual address (VA) and a length of memory required or a starting VA and an ending VA to device driver 308 for use in I/O map and pin calls to the operating system 306. Operating system 306 then translates the virtual address into a set of physical addresses. To I/O map and pin the addresses with the DMA Protection and Translation Logic 322 on PCI Host Bridge 324, operating system 306 searches the translation control entry (TCE) table 316 for a number of consecutive TCE entries that are equal to the length of the address range being requested by application 302 divided by the page size. Once operating system 306 identifies a set of consecutive TCE entries, operating system 306 "pins" the real page numbers (RPNs) associated with each TCE for command response queue 310, input buffer 312, and output buffer 314. Once the RPNs are "pinned," operating system 306 allocates a translation set of consecutive entries for each of command response queue 310, input buffer 312, and output buffer 314 and loads the RPNs into the associated TCE for each buffer page. Operating system 306 may then set the logical partition identifier (LPARid), the process identifier (Pid), the bus/device/function (BDF), a page size, and an address for the physical address space for each translation vector entry (TVE) 318 in translation validation table (TVT) 320 of the PCI host bridge associated with the I/O device. Alternatively, operating system 306 may use the LPARid and the Pid to select a specific TVE 318 in TVT 320 and then set the BDF, the page size, and the address for the physical address space for the selected TVE 318 of the PCI host bridge associated with the I/O device. Thereafter, operating system 306 programs an association between the device driver's virtual addresses and the LPARid and Pid into the I/O device. (The association in the I/O device causes the I/O device to use the LPARid and Pid when referencing those structures in such a way that the appropriate TVE 318 will be selected and authorized.) Finally, operation system 306 returns the starting I/O bus addresses associated with the virtual addresses for command response queue 310, input buffer 312, and output buffer 314 to device driver 308. In order for the adapter to access the address space within command response queue 310, input buffer 312, and output buffer 314 registered by the application 302, DMA Protection and Translation Logic 322 executes a translation flow that is described in FIG. 4.

Then for each I/O command executed by application 302, device driver 308 builds a command in command response queue 310. The command includes the DMA addresses of input buffer 312 and output buffer 314 computed as the virtual address (VA) of the start of the operation data minus the virtual address of the start of the registered memory space, which may also be known as an offset, plus the I/O bus address of the beginning of the registered memory space. Device driver 308 then signals the I/O adapter of the new I/O command upon which the I/O adapter executes the command. Device driver 308 waits for an I/O response to be posted in command response queue 310. Once the I/O response is posted in command response queue 310, device driver signals application 302 that I/O response may be processed.

Upon application 302 being closed, application 302 sends one or more close calls to device driver 308 in order to close all accesses to the I/O devices. Device driver 308 sends one or more I/O un-map and unpin calls to operating system 306 such that operating system 306 closes all registrations of the virtual addresses in command response queue 310, input buffer 312, and output buffer 314.

Thus, a user space application registers memory with a host's address translation and protection table (ATPT). The user space application uses a device driver to register memory for a command response queue, input buffer, and output buffer that are used by the user space application for each of one or more I/O devices. The address(es) for this memory space in each queue/buffer is then stored in the ATPT. The ATPT retains the registration as an association with the application that created the virtual address based buffers for each I/O adapter ensuring that the same virtual address may be used by multiple applications without sharing the same physical memory, thereby precluding any memory corruption due to address ambiguity. Then, for each I/O operation the host's ATPT may be referenced in work request posted by the application directly to the I/O adapter, with no operating system intervention which will be described in FIG. 4.

Figure 4:
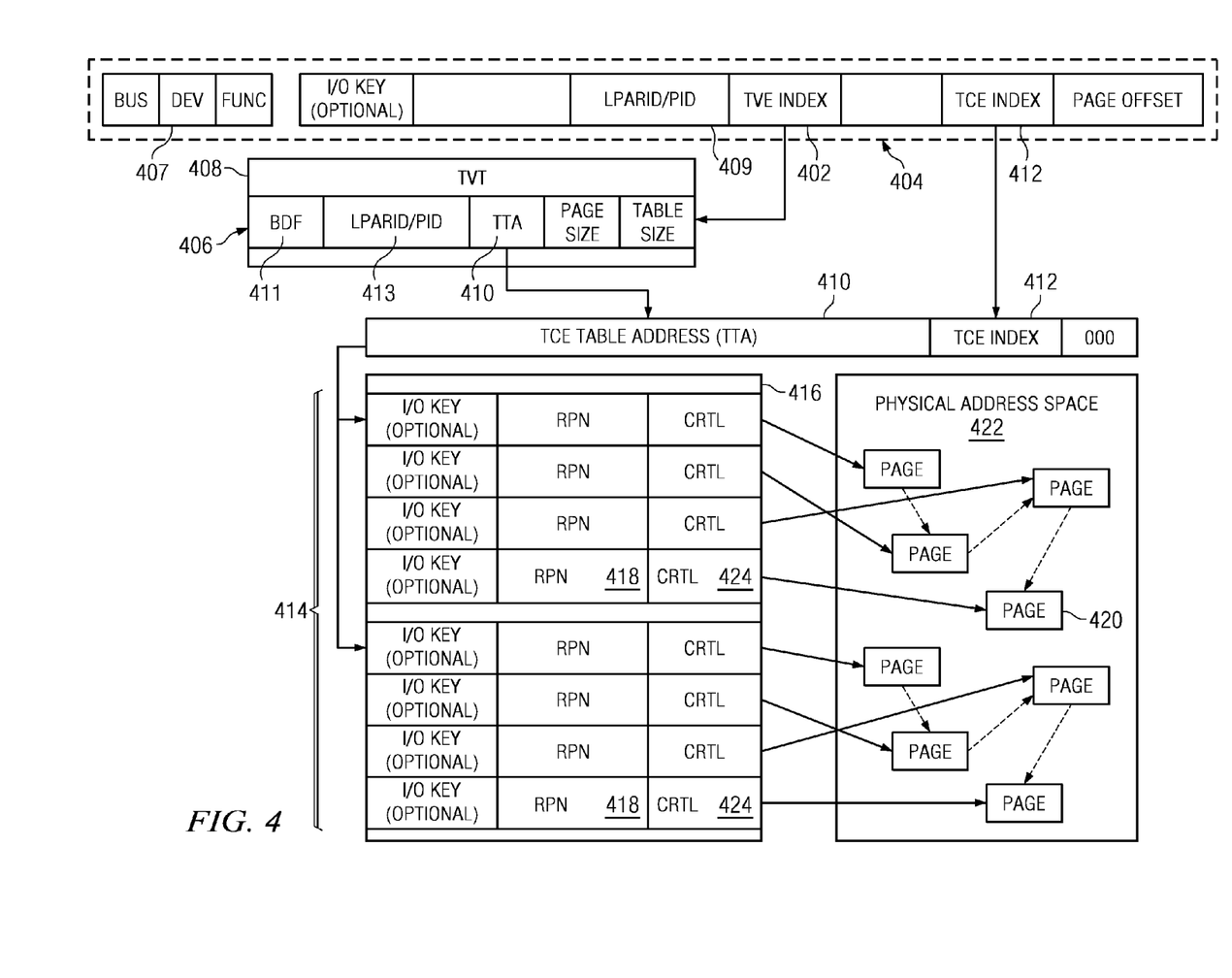
FIG. 4 illustrates an exemplary translation flow performed by DMA Protection and Translation Logic in accordance with an illustrative embodiment.

FIG. 4 illustrates an exemplary translation flow set up by the operating system and performed by DMA Protection and Translation Logic in accordance with an illustrative embodiment. To register memory buffers with the DMA Protection and Translation Logic, an operating system, such as operating system 306 of FIG. 3, performs I/O map and pin operations on the addresses using translation vector entry (TVE) index 402 derived from PCI bus address 404 to identify TVE 406 in translation validation table (TVT) 408. However, to ensure that multiple applications, which use memory that is registered to the same bus/device/function (BDF), do not share the same addresses and cause memory corruption, the DMA Protection and Translation Logic also uses BDF 407 and logical partition identifier (LPARid)/process identifier (Pid) 409 to verify that TVE 406 in TVT 408 is the correct TVE. Once the DMA Protection and Translation Logic identifies TVE 406 in TVT 408, the DMA Protection and Translation Logic compares BDF 407 and LPARid/Pid 409 to BDF 411 and LPARid/Pid 413 of TVE 406. Alternatively, if the LPARid and Pid actually form a portion address, a comparison may not be required or the comparison that is performed may not be as extensive, such as DMA Protection and Translation Logic only comparing BDF 407 to BDF 411. If the comparison of BDF 407 and LPARid/Pid 409 to BDF 411 and LPARid/Pid 413 fail to match, then the I/O adapter is isolated, to eventually be detected by the device driver, which will clean up the problem and notify or terminate the application. However, for the case when the comparison of BDF 407 and LPARid/Pid 409 to BDF 411 and LPARid/Pid 413 match, then the operating system identifies a consecutive number of TCEs 414 in TCE table 416 using TCE table address (TTA) 410 identified in TVE 406 concatenated with TCE index 412 from PCI bus address 404. Each real page number 418 of TCEs 414 translates to a physical I/O page 420 in physical address space 422. Within TCE table 416, TCEs 414 may be segmented into entries specific to an associated logical partition identifier (LPARid) and process identifier (Pid), such that each TCE in TCE table 416 identifies a single physical I/O page 420 within physical address space 422. Access control bits 424 associated with TCEs 414 may be used to validate both the translation and the access rights to physical I/O pages 420. Thus, each of TCEs 414 may identify a 4KB page of memory within the command response queue, the input buffer, or the output buffer and the access rights that the I/O device has to those pages. TCEs 414 may be arranged in TCE table 416 as a contiguous series of memory pages.

Thus, the illustrative embodiments provide a mechanism that allows a user space application to register memory with a host's address translation and protection table (ATPT) and maintain the registrations to ensure that multiple applications registered to the same BDF do not use the same address. The host's ATPT may then be referenced in work request posted by the application directly to the I/O adapter for each I/O operation, with no operating system intervention.

Figure 5:
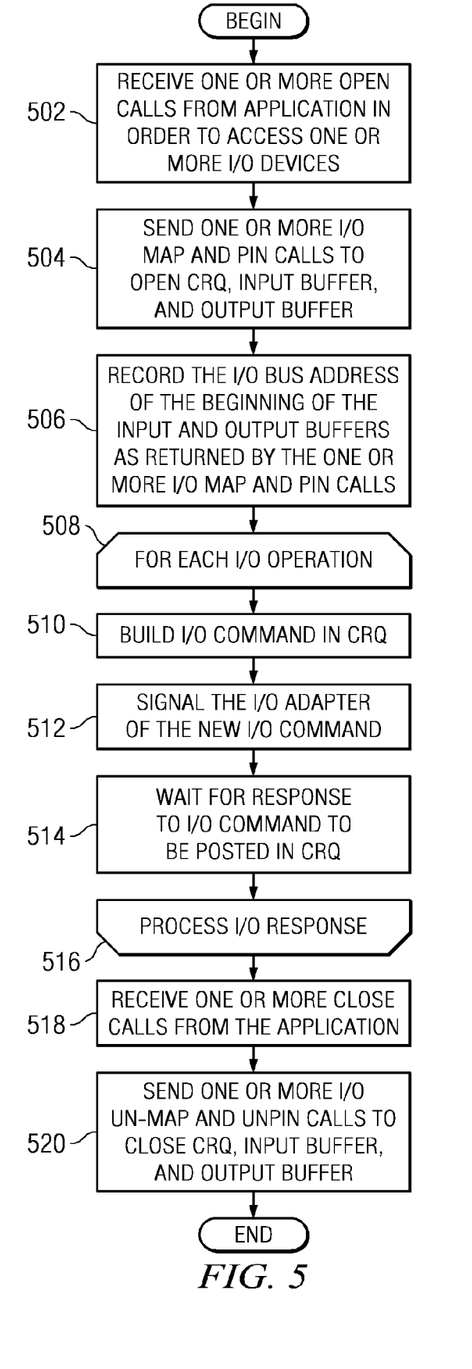
FIG. 5 depicts an exemplary flow diagram of the operation of a system that maps virtual address to PCI bus addresses in accordance with an illustrative embodiment.
Figure 6:
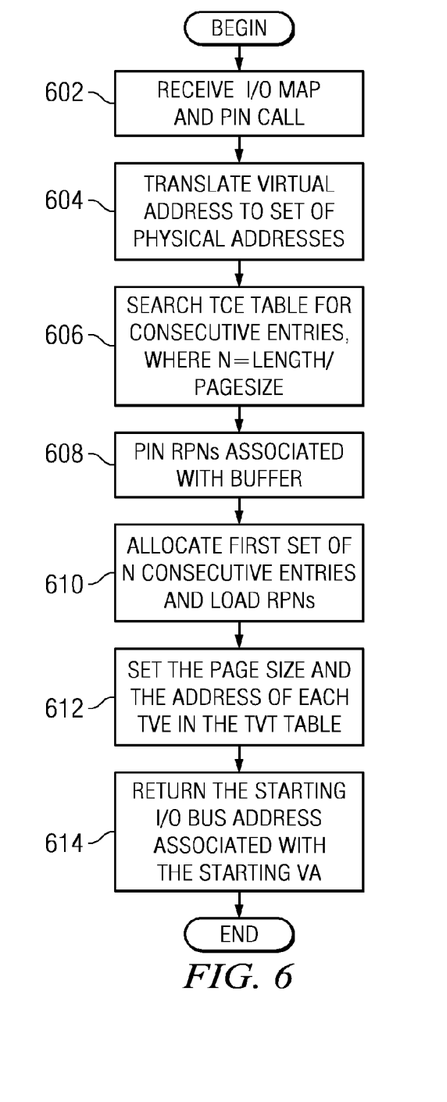
FIG. 6 depicts an exemplary flow diagram of the operation performed in I/O mapping and pinning memory spaces in accordance with an illustrative embodiment.
Figure 7:
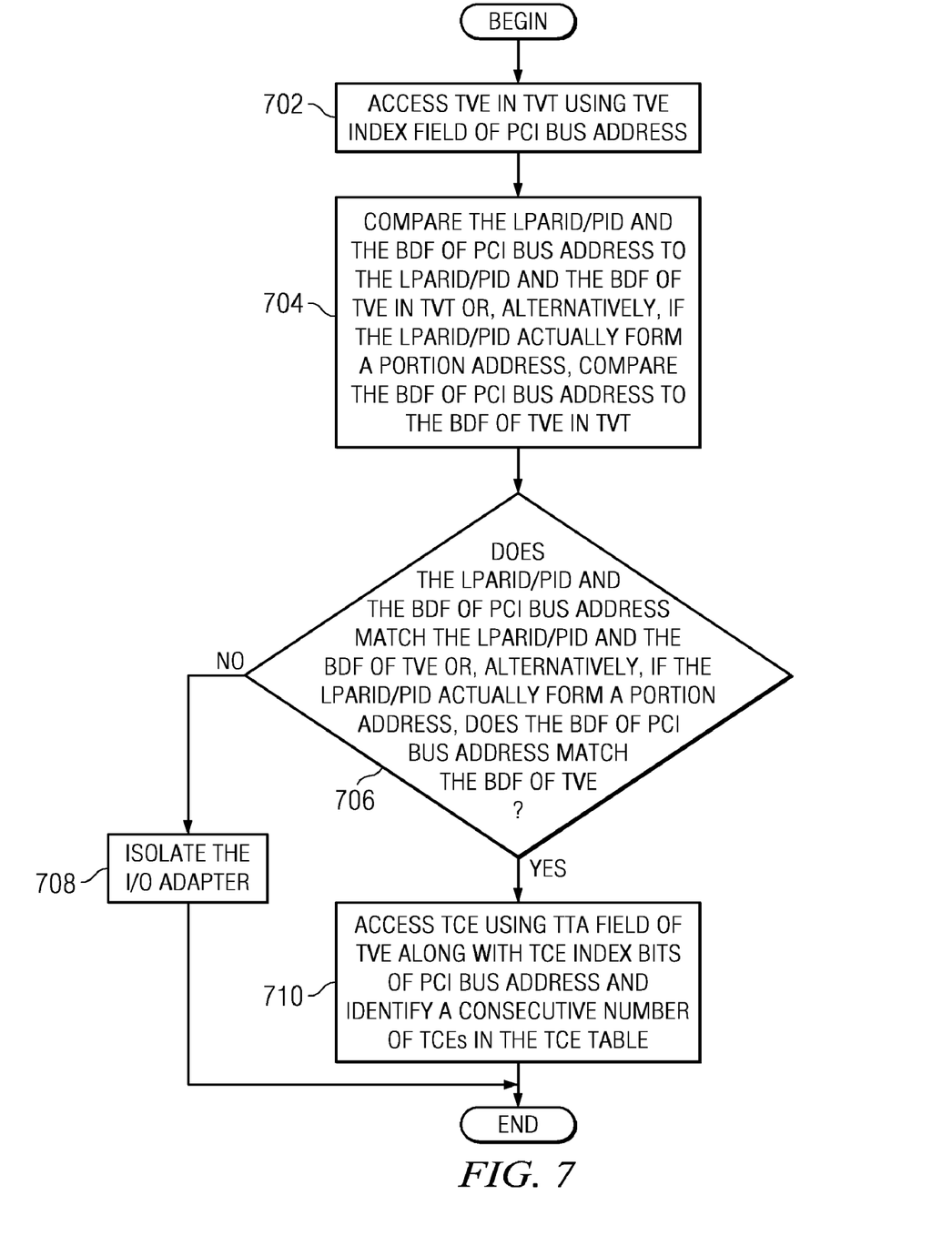
FIG. 7 depicts an exemplary flow diagram of the operation performed by the DMA Protection and Translation Logic in accordance with an illustrative embodiment.

FIGS. 5-7 are flowcharts that illustrate mapping virtual addresses to PCI bus addresses in accordance with the illustrative embodiments. FIG. 5 depicts an exemplary flow diagram of the operation of a system that maps virtual address to PCI bus addresses in accordance with an illustrative embodiment. As the operation begins, a device driver receives one or more open calls from an application that is initialized by an operating system in order that the application may access one or more I/O devices (step 502). Responsive to the open calls, the device driver sends one or more I/O map and pin calls to the operating system to register memory space within a command response queue, an input buffer, and an output buffer for the I/O devices that will be accessed by the application and retain the registered memory space as an association with the application (step 504). As the memory spaces for the command response queue, input buffer, and output buffer are I/O mapped and pinned, these operations return virtual I/O bus addresses for each of the I/O devices indicating the beginning virtual address and the operating system records this beginning virtual address for each memory space registered for each I/O device (step 506). The operation performed by the operating system in translating and pinning the memory spaces will be described in FIG. 6.

Then for each I/O command executed by application (step 508), the device driver builds a command in command response queue (step 510). The command includes the DMA addresses of the input buffer and the output buffer computed as the virtual address (VA) of the start of the operation data minus the virtual address of the start of the registered buffer, which may also be known as an offset, plus the I/O bus address of the beginning of the registered buffer. The device driver then signals the I/O adapter of the new I/O command upon which the I/O adapter executes the command (step 512). The device driver then waits for an I/O response to be posted in command response queue (step 514). Once the I/O response is posted in the command response queue, the device driver signals the application that I/O response may be processed (step 516), with the operation retuning to step 508 for each I/O operation.

Upon the application being closed, the device driver receives one or more close calls from the application in order to close all accesses to the I/O devices (step 518). The device driver sends one or more I/O un-map and unpin calls to the operating system so that the operating system may close all registrations of the virtual addresses in the command response queue, the input buffer, and the output buffer for each I/O device used by the application (step 520), with the operating ending thereafter.

Thus, a user space application registers memory with a host's address translation and protection table (ATPT). The user space application uses a device driver to register memory for one or more I/O devices in a command response queue, input buffer, and output buffer that are used by the user space application. The address(es) for this memory space in each queue/buffer is then stored in the ATPT. Then, for each I/O operation the host's ATPT may be referenced in work request posted by the application directly to the I/O adapter, with no operating system intervention.

FIG. 6 depicts an exemplary flow diagram of the operation performed in I/O mapping and pinning memory spaces in accordance with an illustrative embodiment. As the operation begins, the operating system receives one or more I/O map and pin calls from the device driver (step 602). The operating system then translates the virtual address into a set of physical addresses (step 604). In order to I/O map and pin the addresses with the DMA Protection and Translation Logic, the operating system searches a translation control entry (TCE) table for a number of consecutive TCE entries that are equal to the length of the address range being requested by the application divided by the page size (step 606). An exemplary operation of a translation flow as executed by the DMA Protection and Translation Logic is described in FIG. 7.

Once the operating system identifies a set of consecutive TCE entries, the operating system "pins" the real page numbers (RPNs) associated with each TCE for the command response queue, the input buffer, and the output buffer (step 608). Once the RPNs are "pinned," the operating system allocates a translation set of consecutive entries for each of the command response queue, the input buffer, and the output buffer and loads the RPNs into the associated TCE for each buffer page (step 610). The operating system then sets a page size and an address for the physical address space for each translation vector entry (TVE) in translation validation table (TVT) of the PCI host bridge associated with the I/O device (step 612). Finally, the operation system returns the starting I/O bus addresses associated with the virtual addresses for the command response queue, the input buffer, and the output buffer to the device driver (step 614), with the operating ending thereafter.

Thus, the operating system I/O maps and pins memory spaces for each I/O device accessed by the application within a command response queue, input queue and output queue.

Each of these pinned addresses may be used for I/O operations that are requested by the application.

FIG. 7 depicts an exemplary flow diagram of the operation performed by the DMA Protection and Translation Logic in accordance with an illustrative embodiment. As the operation begins, the DMA Protection and Translation Logic uses a translation vector entry (TVE) index derived from the PCI bus address to identify the TVE in a translation validation table (TVT) (step 702). Once the DMA Protection and Translation Logic identifies the TVE in the TVT table, the DMA Protection and Translation Logic compares the bus/device/function (BDF) and logical partition identifier (LPARid)/process identifier (Pid) of the PCI bus address to the BDF and LPARid/Pid of the TVE entry in the TVT table or, alternatively, if the LPARid and Pid actually form a portion address, a comparison may not be required or the comparison that is performed may not be as extensive, such as DMA Protection and Translation Logic only comparing the BDF of the PCI bus address to the BDF of the TVE entry in the TVT table (step 704).

The DMA Protection and Translation Logic then makes a decision as to whether the BDF and LPARid/Pid of the PCI bus address matches the BDF and LPARid/Pid of the TVE entry, or alternatively, if the LPARid and Pid actually form a portion address, then the DMA Protection and Translation Logic makes a decision as to whether the BDF of the PCI bus address matches the BDF of the TVE entry (step 706). If at step 706 the BDF and logical partition LPARid/Pid of the PCI bus address fail to match the BDF and LPARid/Pid of the TVE entry or, alternatively, if the LPARid and Pid actually form a portion address and the BDF of the PCI bus address fails to match the BDF of the TVE entry, then the I/O adapter is isolated, to eventually be detected by the device driver, which will clean up the problem and notify or terminate the application (step 708), with the operation ending thereafter. If at step 706 the BDF and LPARid/Pid of the PCI bus address matches the BDF and LPARid/Pid of the TVE entry or, alternatively, if the LPARid and Pid actually form a portion address and the BDF of the PCI bus address matches the BDF of the TVE entry, then the DMA Protection and Translation Logic identifies a TCE in the TCE table using the translation control entry (TCE) table address (TTA) identified in the TVE concatenated with the TCE index from the PCI bus address, (step 710), with the operation ending thereafter. The real page number of the TCE maps to a physical memory page in physical address space. Access control bits associated with the TCE may be used to validate both the translation and the access rights to the physical I/O page. Thus, each TCE may identify a 4KB page of memory within the command response queue, the input buffer, or the output buffer and the access rights that the I/O device has to that page. This process is repeated by the DMA Protection and Translation Logic for each storage access performed by the I/O adapter.

Thus, the operating system identifies a consecutive number of entries in a translation control entry table, such that an association is retained between a virtual address based buffer and an application that owns the virtual address based buffer. Using such a mechanism ensures that multiple applications registering memory to the same I/O adapter do not share the same physical address and cause the address space to be corrupted.

As noted above, it should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for registering memory space, the method comprising:
   receiving, by a device driver, one or more open calls from an application to access one or more input/output (I/O) devices, wherein the one or more open calls specify an address range to be associated with each of the one or more I/O devices;
   responsive to receiving the one or more open calls, sending, by the device driver, one or more I/O map and pin calls to an operating system;
   registering, by the operating system, memory space for a command response queue, an input buffer, and an output buffer for each of the one or more I/O devices within at least one storage area that will be accessed by the application in response to receiving the one or more I/O map and pin calls;
   verifying, by the operating system, that the memory space to be registered is associated with the application;
   responsive to the memory space being associated with the application, receiving, by the device driver, one or more starting I/O bus addresses for each registered memory space of the one or more I/O devices; and
   executing, by the device driver, at least one I/O command associated with an I/O device using a corresponding starting I/O bus address associated with the I/O device without intervention by the operating system or an operating system image, wherein registering the memory space for each of the one or more I/O devices in the one or more I/O devices within the at least one storage area comprises translating a virtual address for each I/O device that will be used by the application by:
      searching, by the operating system, a translation control entry (TCE) table to identify a set of consecutive translation control entries equal in length to the address range being requested by the application for the I/O device;

allocating, by the operating system, for each of the command response queue, the input buffer, and the output buffer, a corresponding translation set of consecutive translation control entries from the set of consecutive translation control entries; and loading, by the operating system, for each of the command response queue, the input buffer, and the output buffer, real page numbers corresponding to buffer pages associated with the command response queue, the input buffer, and the output buffer, respectively, into the corresponding translation set of consecutive translation control entries.

2. The method of claim 1, wherein executing the at least one I/O command using the at least one virtual I/O bus address comprises:

identifying, by the operating system, a translation vector entry in the translation validation table;

comparing, by the operating system, at least one of a first logical partition identifier, a first process identifier, and a first bus/device/function identifier associated with a PCI bus address of the one or more I/O devices to at least one of a second logical partition identifier, a second process identifier, and a second bus/device/function identifier associated with the translation vector entry in the translation validation table to identify a match; and responsive to the match, identifying, by the operating system, the set of consecutive translation control entries by accessing a translation control entry using a translation control entry table address identified in the translation vector entry and translation control entry index bits associated with the PCI bus address of the one or more I/O devices.

3. The method of claim 1, further comprising:

receiving, by the device driver, one or more close calls from the application in order to close access to the one or more I/O devices; and responsive to receiving the one or more close calls, sending, by the device driver, one or more I/O un-map and unpin calls to the operating system in order to close the registered memory space within the at least one storage area.

4. The method of claim 1, wherein the at least one I/O command comprises a direct memory access address of at least one of an input buffer or an output buffer.

5. The method of claim 4, wherein the direct memory access address of the input buffer or the output buffer is computed as a virtual address of a start of operation data minus a virtual address of a start of the input buffer or the output buffer plus the starting I/O bus address.

6. A computer program product comprising a non-transitory computer readable medium having a computer readable program recorded thereon, wherein the computer readable program, when executed on a computing device, causes the computing device to:

receive, by a device driver, one or more open calls from an application to access one or more input/output (I/O) devices, wherein the one or more open calls specify an address range to be associated with each of the one or more I/O devices;

responsive to receiving the one or more open calls, send, by the device driver, one or more I/O map and pin calls to an operating system;

register, by the operating system, memory space for a command response queue, an input buffer, and an output buffer for each of the one or more I/O devices within at least one storage area that will be accessed by the application in response to receiving the one or more I/O map and pin calls;

verify, by the operating system, that the memory space to be registered is associated with the application;

responsive to the memory space being associated with the application, receive, by the device driver, one or more starting I/O bus addresses for each registered memory space of the one or more I/O devices; and execute, by the device driver, at least one I/O command associated with an I/O device using a corresponding starting I/O bus address associated with the I/O device without intervention by an operating system or operating system image, wherein to computer readable program to register the memory space for each of the one or more I/O devices in the one or more I/O devices within the at least one storage area further causes the computing device to translate a virtual address for each I/O device that will be used by the application by:

searching, by the operating system, a translation control entry (TCE) table to identify a set of consecutive translation control entries equal in length to the address range being requested by the application for the I/O device;

allocating, by the operating system, for each of the command response queue, the input buffer, and the output buffer, a corresponding translation set of consecutive translation control entries from the set of consecutive translation control entries; and loading, by the operating system, for each of the command response queue, the input buffer, and the output buffer, real page numbers corresponding to buffer pages associated with the command response queue, the input buffer, and the output buffer, respectively, into the corresponding translation set of consecutive translation control entries.

7. The computer program product of claim 6, wherein the computer readable program to execute the at least one I/O command using the at least one virtual I/O bus address further includes computer readable program that causes the computing device to:

identify, by the operating system, a translation vector entry in the translation validation table;

compare, by the operating system, at least one of a first logical partition identifier, a first process identifier, and a first bus/device/function identifier associated with a PCI bus address of the one or more I/O devices to at least one of a second logical partition identifier, a second process identifier, and a second bus/device/function identifier associated with the translation vector entry in the translation validation table to identify a match; and responsive to identifying the match, identify, by the operating system, the set of consecutive translation control entries by accessing a translation control entry using a translation control entry table address identified in the translation vector entry and translation control entry index bits associated with the PCI bus address of the one or more I/O devices.

8. The computer program product of claim 6, wherein the computer readable program further causes the computing device to:

receive, by the device driver, one or more close calls from the application in order to close access to the one or more I/O devices; and responsive to receiving the one or more close calls, send, by the device driver, one or more I/O un-map and unpin calls to the operating system in order to close the registered memory space within the at least one storage area.

9. An apparatus, comprising:

a processor; and a memory coupled to the processor, wherein the memory comprises instructions which, when executed by the processor, cause the processor to:

receive, by a device driver, one or more open calls from an application to access one or more input/output (I/O) devices, wherein the one or more open calls specify an address range to be associated with each of the one or more I/O devices;

responsive to receiving the one or more open calls, send, by the device driver, one or more I/O map and pin calls to an operating system;

register, by the operating system, memory space for a command response queue, an input buffer, and an output buffer for each of the one or more I/O devices within at least one storage area that will be accessed by the application in response to receiving the one or more I/O map and pin calls;

verify, by the operating system, that the memory space to be registered is associated with the application;

responsive to the memory space being associated with the application, receive, by the device driver, one or more starting I/O bus addresses for each registered memory space of the one or more I/O devices; and execute, by the device driver, at least one I/O command associated with the I/O device using a corresponding starting I/O bus address associated with the I/O device without intervention by an operating system or operating system image, wherein to instructions to register the memory space for each of the one or more I/O devices in the one or more I/O devices within the at least one storage area further causes the processor to translate a virtual address for each I/O device that will be used by the application by:

searching, by the operating system, a translation control entry (TCE) table to identify a set of consecutive translation control entries equal in length to the address range being requested by the application for the I/O device;

allocating, by the operating system, for each of the command response queue, the input buffer, and the output buffer, a corresponding translation set of consecutive translation control entries from the set of consecutive translation control entries; and loading, by the operating system, for each of the command response queue, the input buffer, and the output buffer, real page numbers corresponding to buffer pages associated with the command response queue, the input buffer, and the output buffer, respectively, into the corresponding translation set of consecutive translation control entries.

10. The apparatus of claim 9, wherein the instructions to search the translation control entry table to identify a set of consecutive translation control entries further cause the processor to:

identify, by the device driver, a translation vector entry in the translation validation table;

compare, by the device driver, at least one of that a first logical partition identifier, a first process identifier, and a first bus/device/function identifier associated with a PCI bus address of the one or more I/O devices to at least one of a second logical partition identifier, a second process identifier, and a second bus/device/function identifier associated with the translation vector entry in the translation validation table to identify a match; and responsive to identifying the match, identify, by the device driver, the set of consecutive translation control entries by accessing a translation control entry using a translation control entry table address identified in the translation vector entry and translation control entry index bits associated with the PCI bus address of the one or more I/O devices.

11. The apparatus of claim 9, wherein the instructions further cause the processor to:

receive, by the device driver, one or more close calls from the application in order to close access to the one or more I/O devices; and responsive to receiving the one or more close calls, send, by the device driver, one or more I/O un-map and unpin calls to the operating system in order to close the registered memory space within the at least one storage area.

* * * * *